(12) United States Patent
Murase et al.

(10) Patent No.: US 10,573,342 B2
(45) Date of Patent: *Feb. 25, 2020

(54) BASE FOR MAGNETIC RECORDING MEDIUM, AND HDD

(71) Applicant: SHOWA DENKO K.K., Tokyo (JP)

(72) Inventors: Isao Murase, Tochigi (JP); Kiminori Sugimoto, Osaka (JP)

(73) Assignee: SHOWA DENKO K.K., Tokyo (JP)

(*) Notice: Subject to any disclaimer, the term of this patent is extended or adjusted under 35 U.S.C. 154(b) by 173 days.

This patent is subject to a terminal disclaimer.

(21) Appl. No.: 15/866,831

(22) Filed: Jan. 10, 2018

(65) Prior Publication Data

US 2018/0226095 A1    Aug. 9, 2018

(30) Foreign Application Priority Data

Feb. 3, 2017    (JP) .................. 2017-019086

(51) Int. Cl.
*G11B 5/73*    (2006.01)
*G11B 25/04*    (2006.01)

(52) U.S. Cl.
CPC .............. *G11B 5/7315* (2013.01); *G11B 5/73* (2013.01); *G11B 5/7325* (2013.01); *G11B 25/043* (2013.01)

(58) Field of Classification Search
None
See application file for complete search history.

(56) References Cited

U.S. PATENT DOCUMENTS

| | | | | |
|---|---|---|---|---|
| 4,077,810 A * | 3/1978 | Ohuchi | .................. | C22C 21/04 148/439 |
| 4,163,266 A * | 7/1979 | Tamamura | .............. | C22C 21/02 360/130.21 |
| 4,412,870 A * | 11/1983 | Vernam | .................... | C22C 21/06 148/439 |
| 4,826,737 A * | 5/1989 | Yamada | .................. | C22C 21/06 148/522 |
| 5,028,393 A * | 7/1991 | Tanaka | .................. | C22C 21/003 148/439 |
| 5,707,705 A * | 1/1998 | Nelson | ................. | G11B 5/7315 204/192.1 |
| 6,124,039 A * | 9/2000 | Goetz | ..................... | C22C 21/00 216/102 |

(Continued)

FOREIGN PATENT DOCUMENTS

| | | |
|---|---|---|
| CN | 104109783 | 10/2014 |
| CN | 104303231 | 1/2015 |

(Continued)

OTHER PUBLICATIONS

Office Action dated Sep. 12, 2019 issued with respect to the related U.S. Appl. No. 15/621,319.

*Primary Examiner* — Kevin M Bernatz
(74) *Attorney, Agent, or Firm* — IPUSA, PLLC

(57) ABSTRACT

A base for a magnetic recording medium, includes a substrate made of an Al alloy and having a surface, and a film made of a NiP-based alloy and plated on the surface of the substrate. The film has a thickness of 7 µm or greater, and a ratio E/ρ is 29 or greater, where E [GPa] denotes the Young's modulus of the substrate, and ρ [g/cm³] denotes a density of the substrate.

6 Claims, 7 Drawing Sheets

(56) References Cited

U.S. PATENT DOCUMENTS

| | | | |
|---|---|---|---|
| 6,316,097 B1 * | 11/2001 | Liu | G11B 5/7325 |
| | | | 428/332 |
| 6,332,906 B1 * | 12/2001 | Haynes | B22F 3/20 |
| | | | 419/28 |
| 6,490,123 B1 | 12/2002 | Okunaga et al. | |
| 8,404,369 B2 * | 3/2013 | Ruffini | G11B 5/653 |
| | | | 428/832.3 |
| 9,038,704 B2 * | 5/2015 | Williamson | B22D 21/04 |
| | | | 164/113 |
| 9,613,648 B2 * | 4/2017 | Kitawaki | C23C 18/1651 |
| 9,875,765 B2 * | 1/2018 | Yukimatsu | G11B 5/7315 |
| 2003/0143102 A1 * | 7/2003 | Matsuoka | C22C 21/04 |
| | | | 420/546 |
| 2005/0238929 A1 * | 10/2005 | Uwazumi | G11B 5/667 |
| | | | 428/848 |
| 2007/0195457 A1 * | 8/2007 | Matono | G11B 5/1278 |
| | | | 360/123.24 |
| 2008/0318081 A1 * | 12/2008 | Steins | C22C 21/02 |
| | | | 428/640 |
| 2014/0036644 A1 | 2/2014 | Matsumoto et al. | |
| 2014/0334276 A1 | 11/2014 | Matsumoto et al. | |
| 2017/0327930 A1 * | 11/2017 | Kitawaki | C22C 21/00 |
| 2018/0012622 A1 * | 1/2018 | Murase | G11B 5/4806 |
| 2018/0226095 A1 | 8/2018 | Murase et al. | |

FOREIGN PATENT DOCUMENTS

| | | |
|---|---|---|
| JP | H06-145927 | 5/1994 |
| JP | H10-105960 | 4/1998 |
| JP | 2002-150745 | 5/2002 |
| JP | 2009-024265 | 2/2009 |
| JP | 2015-026414 | 2/2015 |
| WO | 2016-068293 | 5/2016 |

\* cited by examiner

FIG.4

| | COMPOSITION [mass%] | | | | | | | |
|---|---|---|---|---|---|---|---|---|
| | Si | Mn | Zn | Sr | Cu | Mg | Zr | Al |
| EI1 | 11.00 | 0.10 | 0.35 | 0.015 | 0.20 | 0.05 | 0.03 | Remainder |
| EI2 | 9.65 | 0.20 | 0.33 | 0.01 | 0.20 | 0.20 | 0.15 | Remainder |
| EI3 | 9.65 | 0.20 | 0.33 | 0.01 | 0.20 | 0.20 | 0.15 | Remainder |
| EI4 | 9.65 | 0.20 | 0.33 | 0.01 | 0.20 | 0.20 | 0.15 | Remainder |
| EI5 | 9.65 | 0.20 | 0.33 | 0.01 | 0.20 | 0.20 | 0.15 | Remainder |
| EI6 | 9.50 | 0.20 | 0.33 | 0.01 | 0.20 | 0.20 | 0.15 | Remainder |
| EI7 | 13.00 | 0.20 | 0.33 | 0.01 | 0.20 | 0.20 | 0.15 | Remainder |
| EI8 | 9.65 | 0.05 | 0.33 | 0.01 | 0.20 | 0.20 | 0.15 | Remainder |
| EI9 | 9.65 | 0.40 | 0.33 | 0.01 | 0.20 | 0.20 | 0.15 | Remainder |
| EI10 | 9.65 | 0.20 | 0.32 | 0.01 | 0.20 | 0.20 | 0.15 | Remainder |
| EI11 | 9.65 | 0.20 | 0.38 | 0.01 | 0.20 | 0.20 | 0.15 | Remainder |
| EI12 | 9.65 | 0.20 | 0.33 | 0.005 | 0.20 | 0.20 | 0.15 | Remainder |
| EI13 | 9.65 | 0.20 | 0.33 | 0.03 | 0.20 | 0.20 | 0.15 | Remainder |
| EI14 | 9.65 | 0.20 | 0.33 | 0.01 | 0.05 | 0.20 | 0.15 | Remainder |
| EI15 | 9.65 | 0.20 | 0.33 | 0.01 | 0.50 | 0.20 | 0.15 | Remainder |
| EI16 | 9.65 | 0.20 | 0.33 | 0.01 | 0.20 | 0.05 | 0.15 | Remainder |
| EI17 | 9.65 | 0.20 | 0.33 | 0.01 | 0.20 | 0.50 | 0.15 | Remainder |
| EI18 | 9.65 | 0.20 | 0.33 | 0.01 | 0.20 | 0.20 | 0.05 | Remainder |
| EI19 | 9.65 | 0.20 | 0.33 | 0.01 | 0.20 | 0.20 | 0.30 | Remainder |
| CE1 | 9.40 | 0.20 | 0.33 | 0.01 | 0.20 | 0.20 | 0.15 | Remainder |
| CE2 | 13.10 | 0.20 | 0.33 | 0.01 | 0.20 | 0.20 | 0.15 | Remainder |
| CE3 | 9.65 | 0.04 | 0.33 | 0.01 | 0.20 | 0.20 | 0.15 | Remainder |
| CE4 | 9.65 | 0.45 | 0.33 | 0.01 | 0.20 | 0.20 | 0.15 | Remainder |
| CE5 | 9.65 | 0.20 | 0.31 | 0.01 | 0.20 | 0.20 | 0.15 | Remainder |
| CE6 | 9.65 | 0.20 | 0.39 | 0.01 | 0.20 | 0.20 | 0.15 | Remainder |
| CE7 | 9.65 | 0.20 | 0.33 | 0.004 | 0.20 | 0.20 | 0.15 | Remainder |
| CE8 | 9.65 | 0.20 | 0.33 | 0.04 | 0.20 | 0.20 | 0.15 | Remainder |
| CE9 | 9.65 | 0.20 | 0.33 | 0.01 | 0.04 | 0.20 | 0.15 | Remainder |
| CE10 | 9.65 | 0.20 | 0.33 | 0.01 | 0.51 | 0.20 | 0.15 | Remainder |
| CE11 | 9.65 | 0.20 | 0.33 | 0.01 | 0.20 | 0.04 | 0.15 | Remainder |
| CE12 | 9.65 | 0.20 | 0.33 | 0.01 | 0.20 | 0.51 | 0.15 | Remainder |
| CE13 | 9.65 | 0.20 | 0.33 | 0.01 | 0.20 | 0.20 | 0.04 | Remainder |
| CE14 | 9.65 | 0.20 | 0.33 | 0.01 | 0.20 | 0.20 | 0.31 | Remainder |

FIG.5

| | Outer Diameter [mm] | Thickness [mm] | Si Grains or Al-Si Compound Grains | | Hv |
|---|---|---|---|---|---|
| | | | Maximum Grain Diameter [$\mu$m] | Distribution Density [Grains/mm$^2$] of Grains Having Maximum Grain Diameter of 8 $\mu$m or Greater | |
| EI1 | 96 | 0.800 | 6.7 | 0 | 67.7 |
| EI2 | 96 | 0.800 | 4.8 | 0 | 64.2 |
| EI3 | 96 | 0.800 | 4.8 | 0 | 64.2 |
| EI4 | 96 | 0.645 | 4.8 | 0 | 64.2 |
| EI5 | 96 | 0.645 | 4.8 | 0 | 64.2 |
| EI6 | 96 | 0.800 | 4.3 | 0 | 63.8 |
| EI7 | 96 | 0.800 | 11.0 | 240 | 72.9 |
| EI8 | 96 | 0.800 | 4.4 | 0 | 60.6 |
| EI9 | 96 | 0.800 | 5.0 | 0 | 69.0 |
| EI10 | 96 | 0.800 | 4.6 | 0 | 64.2 |
| EI11 | 96 | 0.800 | 4.3 | 0 | 64.2 |
| EI12 | 96 | 0.800 | 4.2 | 0 | 64.2 |
| EI13 | 96 | 0.800 | 7.7 | 0 | 64.2 |
| EI14 | 96 | 0.800 | 4.2 | 0 | 62.1 |
| EI15 | 96 | 0.800 | 4.7 | 0 | 68.4 |
| EI16 | 96 | 0.800 | 4.7 | 0 | 60.6 |
| EI17 | 96 | 0.800 | 7.9 | 0 | 71.4 |
| EI18 | 96 | 0.800 | 4.2 | 0 | 64.2 |
| EI19 | 96 | 0.800 | 7.9 | 0 | 64.2 |
| CE1 | 96 | 0.800 | 4.0 | 0 | 63.6 |
| CE2 | 96 | 0.800 | 11.0 | 360 | 73.2 |
| CE3 | 96 | 0.800 | 4.3 | 0 | 60.4 |
| CE4 | 96 | 0.800 | 5.1 | 0 | 70.2 |
| CE5 | 96 | 0.800 | 4.6 | 0 | 64.2 |
| CE6 | 96 | 0.800 | 4.4 | 0 | 64.2 |
| CE7 | 96 | 0.800 | 4.2 | 0 | 64.2 |
| CE8 | 96 | 0.800 | 10.2 | 360 | 64.2 |
| CE9 | 96 | 0.800 | 4.2 | 0 | 62.0 |
| CE10 | 96 | 0.800 | 4.7 | 0 | 68.6 |
| CE11 | 96 | 0.800 | 4.6 | 0 | 60.4 |
| CE12 | 96 | 0.800 | 8.7 | 720 | 71.7 |
| CE13 | 96 | 0.800 | 4.2 | 0 | 64.2 |
| CE14 | 96 | 0.800 | 8.5 | 360 | 64.2 |

FIG.8

| | Thickness [μm] of Plated NiP-Based Alloy Film | Young's Modulus E [GPa] | Density ρ [g/cm³] | E/ρ | Fluttering Displacement [μm] | Machinability | Plating Property |
|---|---|---|---|---|---|---|---|
| EI1 | 10 | 82.2 | 2.71 | 30.33 | 3.2 | ◎ | ◎ |
| EI2 | 10 | 81.0 | 2.72 | 29.77 | 3.3 | ◎ | ◎ |
| EI3 | 20 | 82.8 | 2.85 | 29.05 | 3.4 | ◎ | ◎ |
| EI4 | 10 | 81.4 | 2.75 | 29.59 | 3.2 | ◎ | ◎ |
| EI5 | 20 | 83.6 | 2.88 | 29.03 | 3.4 | ◎ | ◎ |
| EI6 | 10 | 79.4 | 2.72 | 29.20 | 3.4 | ◎ | ◎ |
| EI7 | 10 | 86.4 | 2.71 | 31.87 | 3.1 | ◎ | ○ |
| EI8 | 10 | 79.1 | 2.72 | 29.10 | 3.3 | ◎ | ◎ |
| EI9 | 10 | 81.3 | 2.73 | 29.82 | 3.2 | ◎ | ○ |
| EI10 | 10 | 79.4 | 2.72 | 29.20 | 3.3 | ◎ | ◎ |
| EI11 | 10 | 79.8 | 2.72 | 29.36 | 3.3 | ◎ | ○ |
| EI12 | 10 | 79.1 | 2.72 | 29.09 | 3.4 | ◎ | ◎ |
| EI13 | 10 | 79.3 | 2.72 | 29.17 | 3.4 | ◎ | ◎ |
| EI14 | 10 | 81.0 | 2.72 | 29.77 | 3.3 | ◎ | ◎ |
| EI15 | 10 | 84.9 | 2.73 | 31.12 | 3.1 | ○ | ◎ |
| EI16 | 10 | 79.1 | 2.72 | 29.09 | 3.4 | ◎ | ◎ |
| EI17 | 10 | 84.7 | 2.72 | 31.13 | 3.2 | ○ | ◎ |
| EI18 | 10 | 79.0 | 2.72 | 29.05 | 3.4 | ◎ | ◎ |
| EI19 | 10 | 80.0 | 2.72 | 29.39 | 3.3 | ◎ | ◎ |
| CE1 | 10 | 77.9 | 2.72 | 28.64 | 3.5 | ◎ | ◎ |
| CE2 | 10 | 86.4 | 2.71 | 31.87 | 3.1 | ◎ | ○ |
| CE3 | 10 | 78.9 | 2.72 | 29.02 | 3.5 | ◎ | ◎ |
| CE4 | 10 | 81.8 | 2.73 | 30.00 | 3.1 | ◎ | × |
| CE5 | 10 | 78.9 | 2.72 | 29.02 | 3.5 | ◎ | ◎ |
| CE6 | 10 | 80.0 | 2.72 | 29.39 | 3.2 | ◎ | × |
| CE7 | 10 | 78.8 | 2.72 | 28.98 | 3.5 | ◎ | ◎ |
| CE8 | 10 | 79.4 | 2.72 | 29.20 | 3.4 | ◎ | ○ |
| CE9 | 10 | 76.9 | 2.72 | 28.26 | 3.6 | ◎ | ◎ |
| CE10 | 10 | 85.1 | 2.73 | 31.19 | 3.1 | × | ◎ |
| CE11 | 10 | 78.8 | 2.72 | 28.98 | 3.5 | ◎ | ◎ |
| CE12 | 10 | 85.1 | 2.72 | 31.28 | 3.1 | × | × |
| CE13 | 10 | 78.9 | 2.72 | 29.02 | 3.5 | ◎ | ◎ |
| CE14 | 10 | 80.2 | 2.72 | 29.47 | 3.3 | ◎ | ○ |

BASE FOR MAGNETIC RECORDING MEDIUM, AND HDD

CROSS-REFERENCE TO RELATED APPLICATIONS

This application is based upon and claims priority to Japanese Patent Application No. 2017-019086 filed on Feb. 3, 2017, the entire contents of which are incorporated herein by reference.

BACKGROUND OF THE INVENTION

1. Field of the Invention

The present invention relates to a base for a magnetic recording medium, and a HDD (Hard Disk Drive) having a plurality of magnetic recording media using such a base for the magnetic recording medium.

2. Description of the Related Art

There is demand to considerably improve recording density (or storage capacity) of magnetic recording media that are used in HDDs. Particularly, introduction of a MR (Magneto-Resistive) head and the PRML (Partial Response Maximum Likelihood) technique has further improved in-plane recording density of magnetic recording media.

On the other hand, due to recent developments in the spheres of the Internet and big data utilization, data storage capacities of data centers continue to increase. Due to space limitations at data centers, there are demands to increase storage capacity per unit volume. In other words, in order to increase the storage capacity of one standardized HDD, there are proposals to increase a number of magnetic recording media accommodated within a casing of a standardized HDD.

An Al alloy substrate or a glass substrate is primarily used as a base for magnetic recording media. Compared to glass substrates, Al alloy substrates have a higher toughness and are easier to manufacture, and thus, Al alloy substrates are used for magnetic recording media having a relatively large diameter. A thickness of an Al alloy substrate used for a magnetic recording medium of a 3.5-inch standardized HDD is 1.27 mm, for example.

However, when the thickness of the base for the magnetic recording medium is reduced in order to increase the number of magnetic recording media that can be accommodated within a casing of the HDD, fluttering more easily occurs in the case in which an Al alloy substrate is used when compared to the case in which a glass substrate is used. Fluttering of a magnetic recording medium occurs when the magnetic recording medium is rotated at a high speed. When fluttering occurs, it becomes difficult to stably read information from the magnetic recording medium within the HDD.

In the case in which a glass substrate is used, for example, the base for the magnetic recording medium is made of a material having a high Young's modulus in order to reduce fluttering, as proposed in Japanese Laid-Open Patent Publication No. 2015-26414, for example.

In addition, there is a proposal to fill the inside of the casing of the 3.5-inch standardized HDD with helium gas in order to reduce fluttering of magnetic recording media. According to this proposal, 6 or more magnetic recording media can be accommodated within the casing, by reducing the thickness of the aluminum alloy substrate.

Generally, the Al alloy substrate is manufactured as follows. First, an Al alloy plate having a thickness on the order of 2 mm or less is formed into a donut-shaped substrate having a desired size by punching. Next, inner and outer peripheral edges of the donut-shaped substrate are chamfered, and data recording surfaces of the donut-shaped substrate are subjected to machining by rotation. Surface roughness and undulation of the data recording surfaces are reduced by grinding using a grinding stone. Thereafter, from a viewpoint of providing surface hardness and reducing surface defects, the substrate surfaces are NiP-plated. Next, both substrate surfaces (or data recording surfaces), having the plated NiP film, are subjected to polishing, to form the base for the magnetic recording medium.

The bases for the magnetic recording media are mass-produced, and high cost performances are required of the bases for the magnetic recording media. For this reason, the Al alloys used for the bases for the magnetic recording media are required to have high machinability and low cost.

For example, Japanese Laid-Open Patent Publication No. 2009-24265 proposes an Al alloy including Mg in a range of 0.3 mass % to 6 mass %, Si in a range of 0.3 mass % to 10 mass %, Zn in a range of 0.05 mass % to 1 mass %, Sr in a range of 0.001 mass % to 0.3 mass %, and the remainder being Al and impurities.

In addition, International Publication Pamphlet No. WO2016/068293 proposes an Al alloy substrate for a magnetic disk, including Si in a range of 0.5 mass % to 24.0 mass % or less, Fe in a range of 0.01 mass % to 3.00 mass %, and the remainder being Al and unavoidable impurities.

Further, Japanese Laid-Open Patent Publication No. 6-145927 proposes a method of manufacturing a rolled plate for a magnetic disk, made of an Al—Mg alloy. This method performs continuous casting on a thin plate made of an Al—Mg alloy including 0.1 wt % Zr or less to a thickness in a range of 4 mm to 10 mm, and performs cold-roll at a reduction of 50% or higher without soaking the cast metal plate. Thereafter, annealing is performed at a temperature in a range of 300° C. to 400° C., to thereby manufacture a rolled plate having an average crystal grain diameter of 15 µm or less at a surface layer portion of the rolled plate. The Al—Mg alloy includes Mg in a range of 2.0 wt % to 6.0 wt %, at least one of Ti and B in a range of 0.01 wt % to 0.1 wt %, and at least one of Cr in a range of 0.03 wt % to 0.3 wt % and Mn in a range of 0.03 wt % to 0.3 wt %.

SUMMARY OF THE INVENTION

Embodiments of the present invention can provide a base for a magnetic recording medium, capable of reducing fluttering even when a thickness of the magnetic recording medium is reduced.

According to one aspect of the present invention, a base for a magnetic recording medium includes a substrate made of an Al alloy and having a surface, and a film made of a NiP-based alloy and plated on the surface of the substrate, wherein the Al alloy includes Si in a range of 9.5 mass % to 13.0 mass %, Mn in a range of 0.05 mass % to 0.40 mass %, Zn in a range of 0.30 mass % to 0.40 mass %, Sr in a range of 0.005 mass % to 0.03 mass %, Cu in a range of 0.05 mass % to 0.50 mass %, Mg in a range of 0.05 mass % to 0.50 mass %, and Zr in a range of 0.03 mass % to 0.30 mass %, wherein the substrate has a distribution density of 300 grains/mm$^2$ or lower for grains having a maximum diameter of 8 µm or greater, between Si grains and Al—Si compound grains, and a Young's modulus of 79 GPa or higher, wherein the film has a thickness of 7 µm or greater, and wherein the substrate has an outer diameter of 53 mm, and a thickness of 0.9 mm or less.

According to another aspect of the present invention, a base for a magnetic recording medium, includes a substrate made of an Al alloy and having a surface, and a film made of a NiP-based alloy and plated on the surface of the substrate, wherein the film has a thickness of 7 µm or greater, and wherein a ratio E/ρ is 29 or greater, where E [GPa] denotes the Young's modulus of the substrate, and ρ [g/cm³] denotes a density of the substrate.

According to a further aspect of the present invention, a hard disk drive includes a plurality of magnetic disks, a plurality of heads configured to write information to and read information from the plurality of magnetic disks, and a casing configured to accommodate the plurality of magnetic disks and the plurality of heads, wherein each of the plurality of magnetic disks includes either one of the bases for the magnetic recording media described above.

Other objects and further features of the present invention will be apparent from the following detailed description when read in conjunction with the accompanying drawings.

BRIEF DESCRIPTION OF THE DRAWINGS

FIG. 4 is a diagram illustrating compositions of composition-adjusted Al alloy materials forming the Al alloy substrates of exemplary implementations and comparison examples;

FIG. 5 is a diagram illustrating performances of the Al alloy substrates of the exemplary implementations and the comparison examples;

FIG. 8 is a diagram illustrating properties and evaluation results of the bases for the magnetic recording media of the exemplary implementations and the comparison examples.

DESCRIPTION OF THE PREFERRED EMBODIMENTS

Figure 1:
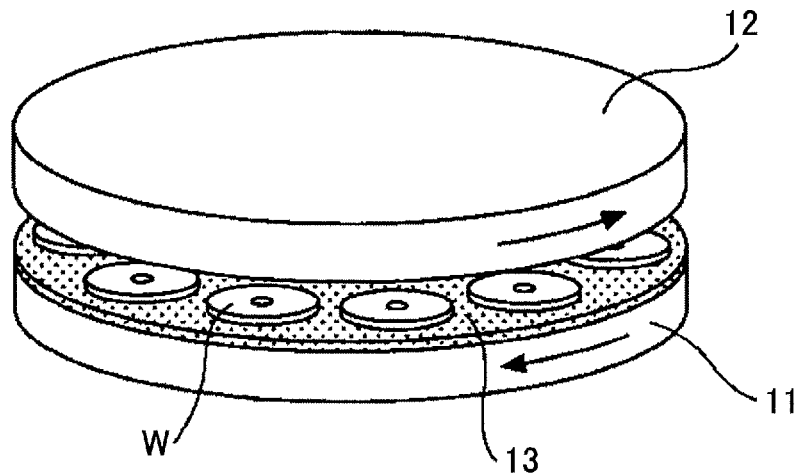
FIG. 1 is a perspective view for explaining an example of a method of manufacturing a base for a magnetic recording medium in accordance with one embodiment of the present invention.

A description will be given of embodiments and exemplary implementations of the base for the magnetic recording medium according to the present invention, by referring to the drawing.

In one embodiment of the present invention, a base for a magnetic recording medium may include a substrate made of an aluminum (Al) alloy and having a surface, and a film made of a nickel-phosphorous-based (NiP-based) alloy and plated on the surface of the substrate. The Al alloy may include silicon (Si) in a range of 9.5 mass % to 13.0 mass %, manganese (Mn) in a range of 0.05 mass % to 0.40 mass %, zinc (Zn) in a range of 0.30 mass % to 0.40 mass %, strontium (Sr) in a range of 0.005 mass % to 0.03 mass %, copper (Cu) in a range of 0.05 mass % to 0.50 mass %, magnesium (Mg) in a range of 0.05 mass % to 0.50 mass %, and zirconium (Zr) in a range of 0.03 mass % to 0.30 mass %. The substrate may have a distribution density of 300 grains/mm² or lower for grains having a maximum diameter of 8 µm or greater, between Si grains and Al—Si compound grains. The film may have a thickness of 7 µm or greater. The substrate may have an outer diameter of 53 mm, a thickness of 0.9 mm or less, and a Young's modulus of 79 GPa or higher.

In one embodiment, the base for the magnetic recording medium may include a disk-shaped substrate made of the Al alloy and having a center opening at a center thereof, and a film made of the NiP-based alloy plated on a surface of the disk-shaped substrate. The magnetic recording medium using this base may include a magnetic layer, a protection layer, a lubricant layer, or the like that are successively stacked above a surface of the plated NiP-based alloy film. A HDD using this magnetic recording medium may include a casing to accommodate this magnetic recording medium, a spindle motor, a magnetic head, or the like. A center part of the magnetic recording medium is mounted on a rotary shaft of the spindle motor, and the magnetic head floats on a surface of the magnetic recording medium that is driven and rotated by the spindle motor. The floating magnetic head writes information to and reads information from the surface of the magnetic recording medium. A pair of magnetic heads may be used to write information to and read information from both surfaces of the magnetic recording medium. In addition, a plurality of magnetic recording media may be accommodated within the casing. The HDD may have a known configuration.

Generally, in the HDD, the magnetic recording medium is rotated at a high speed of 5000 rpm or higher. For this reason, when the magnetic recording medium has poor mechanical properties, fluttering of the magnetic recording medium increases to make it difficult to stably read information from the magnetic recording medium within the HDD.

The present inventors conceived that the fluttering of the magnetic recording medium and the Young's modulus of the base for the magnetic recording medium are interrelated, that is, closely related. The present inventors also conceived that the fluttering can be reduced by increasing the Young's modulus of the base for the magnetic recording medium, and that by setting the Young's modulus of the base for the magnetic recording medium to 79 GPa or higher, it is possible to manufacture a magnetic recording medium having an outer diameter of 53 mm or greater and a thickness of 0.9 mm or less.

In one embodiment, the Al alloy substrate includes Si in a range of 9.5 mass % to 13.0 mass %, and preferably in a range of 10.0 mass % to 12.0 mass %.

In one embodiment, the Al alloy substrate includes Mn in a range of 0.05 mass % to 0.40 mass %, and preferably in a range of 0.10 mass % to 0.30 mass %.

In one embodiment, the Al alloy substrate includes Zn in a range of 0.30 mass % to 0.40 mass %, and preferably in a range of 0.32 mass % to 0.38 mass %.

In one embodiment, the Al alloy substrate includes Sr in a range of 0.005 mass % to 0.03 mass %, and preferably in a range of 0.01 mass % to 0.02 mass %.

In one embodiment, the Al alloy substrate includes Cu in a range of 0.05 mass % to 0.50 mass %, and preferably in a range of 0.10 mass % to 0.30 mass %.

In one embodiment, the Al alloy substrate includes Mg in a range of 0.05 mass % to 0.50 mass %, and preferably in a range of 0.10 mass % to 0.30 mass %.

In one embodiment, the Al alloy substrate includes Zr in a range of 0.03 mass % to 0.30 mass %, and preferably in a range of 0.05 mass % to 0.15 mass %.

In one embodiment, the distribution density of the grains having the maximum diameter of 8 µm or greater in the Al alloy substrate, between the Si grains and the Al—Si compound grains, is 300 grains/mm$^2$ or lower, preferably 100 grains/mm$^2$ or lower, and most preferably 0 (zero).

In one embodiment, the Al alloy substrate includes the 7 preferably added elements which are Si, Mn, Zn, Sr, Cu, Mg, and Zr, appropriately added elements that are added if appropriate, unavoidable impurities, and Al amounting to the remainder of the Al alloy. In one example, the preferably added element may be an essential element added to the Al alloy forming the Al alloy substrate.

In one embodiment, the Young's modulus of the Al alloy substrate can be increased considerably, because the Al alloy includes a large amount of Si. However, a large amount of Si grains or Al—Si compound grains is dispersed in an alloy structure of the Al alloy including the large amount of Si. Hence, depending on manufacturing conditions, the maximum diameter of the Si grains or the Al—Si compound grains may finally grow to a size in a range of 8 µm to 10 µm, or to an even larger size. In a case in which a large amount of Si grains or Al—Si compound grains having the maximum diameter of 8 µm or greater is dispersed in the alloy structure of the Al alloy, it is difficult to uniformly plate the NiP-based alloy film on the surface of the Al alloy substrate, to thereby result in a non-uniform film quality of the plated NiP-based alloy film.

In order to solve the problem described above, one embodiment of the present invention adds Sr to the Al alloy forming the Al alloy substrate. The addition of Sr reduces the size of the Si grains or the Al—Si compound grains by crystal grain refining, to enable uniform plating of the NiP-based alloy film on the surface of the Al alloy substrate. In addition, by reducing the size of the Si grains or the Al—Si compound grains by crystal grain refining, it is possible to improve the machinability of the Al alloy.

In one embodiment, Zr is a preferably added element that is preferably added to the Al alloy forming the Al alloy substrate.

Zr is popularly used as an added element to Al—Mg alloys, for the purposes of obtaining the effect of pinning Al$_3$Zr finely precipitating into the Al—Mg alloys.

On the other hand, according to studies conducted by the present inventors, the effects of adding Zr to the Al—Si alloy in one embodiment includes the effect of reducing the size of the Si grains or the Al—Si compound grains by crystal grain refining, that is similar to the effect of adding Sr, and also the effect of increasing the Young's modulus of the Al alloy by forming fine Si$_2$Zr compound within the Al alloy forming the Al alloy substrate. Hence, the distribution density of the Al alloy substrate can be made to become 300 grains/mm$^2$ or lower for the grains having the maximum diameter of 8 µm or greater, between the Si grains and the Al—Si compound grains. In addition, the Young's modulus of the Al alloy substrate can be made to become 79 GPa or higher in the base for the magnetic recording medium.

Next, a more detailed description will be given of each of the added elements added to the Al alloy forming the Al alloy substrate.

Si is dispersed within the Al alloy structure as free grains of Si, excluding an amount required to foil a compound due to the small amount of solid solution into the Al. In the Al alloy structure in which the Si grains are dispersed, scraping or grinding of the Si grains by a cutting tool, or interfacial peeling between the Si grains and the Al parent phase, quickly provides separation (or parting) of scrape or chip to improve the machinability (for example, cutting) of the Al alloy.

In addition, the element Sr that is preferably added to the Al alloy, or sodium (Na), calcium (Ca), or the like that are added arbitrarily if appropriate, causes the spheroidizing and size reduction of the Si grains or the Al—Si grains by crystal grain refining, to thereby also improve the machinability of the Al alloy.

When the Si-content is less than 9.5 mass %, the effect of increasing the Young's modulus of the Al alloy decreases, and the effect of improving the separation (or parting) of scrape or chip deteriorates. On the other hand, when the Si-content exceeds 13.0 mass %, the separation (or parting) of scrape or chip improves, however, the frictional wear of the cutting tool becomes notable to deteriorate a productivity of the base for the magnetic recording medium.

The element Mn that is preferably added finely precipitates into the Al alloy structure, and has the effect of improving the mechanical properties of the Al alloy.

When the Mn-content is less than 0.05 mass %, the effect of improving the mechanical properties of the Al alloy deteriorates. On the other hand, when the Mn-content exceeds 0.40 mass %, the effect of improving the mechanical properties of the Al alloy saturates, and the mechanical properties of the Al alloy no longer improves.

The element Zn that is preferably added is solved in the Al alloy structure, and bonds to other added elements, to form precipitation that is dispersed within the alloy structure. For this reason, the mechanical properties of the Al alloy is improved, and the machinability of the Al alloy is improved due to synergy effect with other solid solution elements.

When the Zn-content is less than 0.30 mass %, the effect of improving the mechanical properties of the Al alloy deteriorates. On the other hand, when the Zn-content exceeds 0.40 mass %, corrosion resistance of the Al alloy may deteriorate.

By coexisting with Si, the element Sr that is preferably added to the Al alloy causes spheroidizing and size reduction of primary crystal Si and eutectic Si at the time of solidification. For this reason, the element Sr coexisting with Si has the effect of indirectly improving the separation (or parting) of scrape or chip to improve the machinability of the Al alloy, and to reduce the frictional wear and damage to the cutting tool. In addition, the element Sr has the effect of uniformly and finely dispersing the Si grains or the Al—Si compound grains in the process such as continuous casting, extrusion, drawing, or the like, to further improve the machinability of the Al alloy. Furthermore, the structure of the plated NiP-based alloy film provided on the Al alloy substrate becomes uniform, and the film quality of the plated NiP-based alloy film also becomes uniform.

In other words, in a case in which a conventional Al alloy including a large amount of Si is used for the base for the magnetic recording medium, the plated NiP-based alloy film is uneasily formed on the surface of the Si grains or the Al—Si compound grains, and consequently, defects, such as dents, pits, or the like, are easily formed at surface locations on the Si grains or the Al—Si compound grains where the plated NiP-based alloy film is not formed.

On the other hand, one embodiment eliminates this problem that is encountered in the case in which the conventional Al alloy including the large amount of Si is used for the base for the magnetic recording medium. More particularly, according to one embodiment, it is possible to provide a base for the magnetic recording medium having a uniform plated film on the substrate.

When the Sr-content is less than 0.005 mass %, the effect of improving the machinability of the Al alloy deteriorates, and the spheroidizing of the Si grains or the Al—Si compound grains may not occur to generate acute-angled portions, to notably increase the frictional wear of the cutting tool. On the other hand, when the Sr-content exceeds 0.03 mass %, the above described effect of improving the machinability of the Al alloy saturates, and the machinability of the Al alloy no longer improves. In addition, in this latter case, the plated NiP-based alloy film is uneasily formed because crystallization of primary crystal $SrAl_4$ occurs, and defects, such as dents, pits, or the like, are easily formed at surface locations where the crystallization of primary crystal $SrAl_4$ occurs and the plated NiP-based alloy film is not formed.

The element Cu that is preferably added to the Al alloy is solved in the Al alloy structure, and has the effect of improving the strength of the Al alloy, and also has the effect of forming a $Al_2Cu$ phase to further improve the strength of the Al alloy.

When the Cu-content is less than 0.05 mass %, the effect of improving the strength of the Al alloy deteriorates. On the other hand, when the Cu-content exceeds 0.50 mass %, the effect of improving the strength of the Al alloy saturates, and the strength of the Al alloy no longer improves.

The element Mg that is preferably added to the Al alloy is solved in the Al alloy structure, similarly to the element Cu, and has the effect of improving the strength of the Al alloy, and also has the effect of forming a $Mg_2Si$ phase to further improve the strength of the Al alloy.

When the Mg-content is less than 0.05 mass %, the effect of improving the strength of the Al alloy deteriorates. On the other hand, when the Mg-content exceeds 0.50 mass %, the effect of improving the strength of the Al alloy saturates, and the strength of the Al alloy no longer improves.

The element Zr that is preferably added as described above bonds to Si to form fine $Si_2Zr$ compound. Hence, the element Zr that is preferably added has the effect of increasing the Young's modulus of the Al alloy substrate, and also has the effect of further reducing the size of the Si grains or the Al—Si compound grains by crystal grain refining, by the formation of the $Si_2Zr$ compound.

When the Zr-content is less than 0.03 mass %, the effect of increasing the Young's modulus of the Al alloy substrate deteriorates. On the other hand, when the Zr-content exceeds 0.30 mass %, the effect of increasing the Young's modulus saturates, and the Young's modulus no longer improves.

The elements that may be appropriately added to the Al alloy of the Al alloy substrate include iron (Fe), chromium (Cr), titanium (Ti), lead (Pb), bismuth (Bi), boron (B), vanadium (V), Na, and Ca. An added content of each of these elements Fe, Cr, Ti, Pb, Bi, B, V, Na, and Ca that are appropriately added to the Al alloy is preferably 1 mass % or less, or zero (that is, not added). A total amount of these elements Fe, Cr, Ti, Pb, Bi, B, V, Na, and Ca that are appropriately added to the Al alloy is preferably 4 mass % or less.

The effects of adding these elements Fe, Cr, Ti, Pb, Bi, B, V, Na, and Ca that are appropriately added to the Al alloy include an improvement to castability (for example, fluidity, shrinkage, and hot crack resistance (or castability)), an improvement to mechanical properties, an improvement to machinability (for example, cutting), and an improvement to crystal grain refining, as is generally known for 4000-series aluminum silicon alloys.

On the other hand, it is undesirable for the added content of each of these elements Fe, Cr, Ti, Pb, Bi, B, V, Na, and Ca, that are appropriately added to the Al alloy, to exceed 1 mass %, or the total amount of these elements Fe, Cr, Ti, Pb, Bi, B, V, Na, and Ca, that are appropriately added to the Al alloy, to exceed 4 mass %, because the effects of adding the elements Si, Mn, Zn, Sr, Cu, Mg, and Zr that are preferably added to the Al alloy are deteriorated thereby. Particularly, in order to emphasize the effects of adding the elements Si, Mn, Zn, Sr, Cu, Mg, and Zr that are preferably added to the Al alloy, the added content of each of these elements Fe, Cr, Ti, Pb, Bi, B, V, Na, and Ca that are appropriately added to the Al alloy is preferably 0.5 mass % or less, and more preferably 0.1 mass % or less.

The Al alloy substrate in one embodiment may be manufactured according to a known method. For example, an Al alloy material with content-adjusted components may be heated and melted, and then subjected to casting, milling, heating and sintering, punching, or the like, to form a disk-shaped substrate. A center opening having a prescribed size may be formed at a center of the disk-shaped substrate by the punching. The heating and sintering may be performed before or after forming the disk-shaped substrate, to reduce distortions existing on the substrate and adjust the Young's modulus of the substrate to a value within an appropriate range.

An outer diameter of the Al alloy substrate in one embodiment is 53 mm or greater. As described above, the Al alloy substrate in one embodiment may be used for the purposes of increasing the number of magnetic recording media accommodated within a standardized HDD casing. Hence, the Al alloy substrate is preferably accommodatable within the standardized HDD casing, that is, the 2.5-inch HDD casing, the 3.5-inch HDD casing, or the like. A maximum diameter of the substrate used in the 2.5-inch HDD casing is approximately 67 mm, and a maximum diameter of the substrate used in the 3.5-inch HDD casing is approximately 97 mm. Hence, the outer diameter of the Al alloy substrate in one embodiment is preferably 53 mm or greater.

It is particularly preferable that the Al alloy substrate in one embodiment is used in the 3.5-inch HDD that has a higher recording capacity than the 2.5-inch HDD. A maximum of 5 magnetic recording media each having a thickness of 1.27 mm are accommodated in the existing 3.5-inch HDD casing. On the other hand, the base for the magnetic recording medium in one embodiment has a thickness of 0.9 mm or less, and thus, 6 or more magnetic recording media can be accommodated within the 3.5-inch HDD casing.

In addition, the base for the magnetic recording medium in one embodiment can reduce the fluttering of the magnetic recording medium. For this reason, the base for the magnetic recording medium in one embodiment can reduce the fluttering in air, thereby making it unnecessary to encapsulate a low-molecular gas, such as helium gas or the like, inside HDD casing. As a result, the manufacturing cost of the HDD having the high recording capacity can be reduced. In addition, in a case in which the base for the magnetic recording medium in one embodiment is used in the HDD casing encapsulating the low-molecular gas such as helium gas, it is possible to further reduce the fluttering of the magnetic recording medium.

The thickness of the plated NiP-based alloy film in one embodiment is 7 μm or greater, and preferably 10 μm or greater.

The thickness of the plated NiP-based alloy film on the existing base for the magnetic recording medium is less than 7 μm. However, in one embodiment, the thickness of the plated NiP-based alloy film in one embodiment is less than 7 μm, so that the Young's modulus of the base for the magnetic recording medium is increased to 79 GPa or higher.

In one embodiment, a NiP-based alloy is preferably used for the plated NiP-based alloy film. The NiP-based alloy includes P, at least one element appropriately added to P, unavoidable impurities, and Ni amounting to the remainder of the NiP-based alloy.

Preferably, the NiP-based alloy includes P in a range of 10 mass % to 15 mass %. In this case, it is possible to increase the Young's modulus of the base for the magnetic recording medium compared to the base for the magnetic recording medium before being plated with the NiP-based alloy film.

In one embodiment, the NiP-based alloy forming the NiP-based alloy film is preferably a NiWP-based alloy. The NiWP-based alloy includes W, P, elements that are appropriately added, unavoidable impurities, and Ni amounting to the remainder of the NiWP-based alloy.

The NiWP-based alloy preferably includes W in a range of 15 mass % to 22 mass %, and P in a range of 3 mass % to 10 mass %. In this case, it is possible to further increase the Young's modulus of the base for the magnetic recording medium.

The plated NiP-based alloy film may be plated by a known plating method. For example, the plating method may use a plating solution of NiP-based alloy, added with W-salt. The W-salt may include sodium tungstate, potassium tungstate, ammonium tungstate, or the like.

The plating method is preferably an electroless plating method.

The thickness of the plated NiP-based alloy film may be adjusted by an immersion time in the plating solution, a temperature of the plating solution, or the like.

The plating condition is not limited to a particular condition. For example, the plating solution may preferably have a pH of 5.0 to 8.6, and a temperature of 70° C. to 100° C. and more preferably 85° C. to 95° C. In addition, an immersion time in the plating solution may preferably be 90 minutes to 150 minutes.

A heat treatment is preferably performed after plating the NiP-based alloy film on the substrate. In this case, it is possible to increase a hardness of the plated film, and further increase the Young's modulus of the base for the magnetic recording medium. A heat treatment temperature after plating the NiP-based alloy film on the substrate is preferably 3.00° C. or higher.

In one embodiment, when the Young's modulus of the base for the magnetic recording medium is denoted by E [GPa], and a density of the base for the magnetic recording medium is denoted by $\rho$ [g/cm$^3$], a ratio E/$\rho$ is preferably 29 or greater.

As described above, the present inventors conceived that the fluttering of the magnetic recording medium and the Young's modulus of the base for the magnetic recording medium are interrelated, that is, closely related, and that the fluttering can be reduced by increasing the Young's modulus of the base for the magnetic recording medium.

The Al alloy substrate for the conventional magnetic recording medium in many cases uses 5000-series Al alloy. However, the 5000-series Al alloy has a density of approximately 2.8 g/cm$^3$ and a Young's modulus of approximately 74 GPa, and thus, the ratio E/$\rho$ is approximately 26.4.

On the other hand, in one embodiment, the Al alloy substrate includes the 7 preferably added elements which are Si, Mn, Zn, Sr, Cu, Mg, and Zr, added to Al. Consequently, the Al alloy forming the Al alloy substrate displays satisfactory properties including a high Young's modulus. In addition, because the Al alloy substrate in one embodiment includes the appropriately added elements, such as Fe having a high density $\rho$, amounting only to 0.01 mass % or less, which is comparable to the amount of unavoidable impurities, it is possible to reduce the density $\rho$ of the Al alloy. For this reason, the Al alloy substrate in one embodiment can have a Young's modulus in a range of 79 GPa to 87 GPa, a density in a range of 2.7 g/cm$^3$ to 3.0 g/cm$^3$, and the ratio E/$\rho$ of 29 or greater.

The Al alloy substrate having the ratio E/$\rho$ of 29 or greater was not achievable in the conventional base for the magnetic recording medium. Hence, in one embodiment, the base for the magnetic recording medium can reduce the fluttering when used in the HDD, and the performance of the HDD can be greatly improved.

According to the method of manufacturing the base for the magnetic recording medium in one embodiment, the Al alloy substrate is plated, and the surface of this plated Al alloy substrate is preferably polished thereafter.

In addition, in one embodiment, from a viewpoint of simultaneously improving the surface quality, such as forming a smooth surface and reducing surface damage, and improving the productivity, it is preferable to employ a multi-stage polishing using a plurality of independent grinders and including 2 or more polishing stages. For example, the process of polishing the surface of the plated Al alloy substrate may include a coarse polishing stage that polishes the surface of the plated Al alloy substrate using a first grinder while supplying a polishing agent that includes alumina abrasive grains, and a finishing stage that washes the surface of the plated Al alloy substrate and thereafter finishes the surface of the plated Al alloy substrate using a second grinder while supplying a polishing agent that includes colloidal silica grains.

FIG. 1 is a perspective view for explaining an example of the method of manufacturing the base for the magnetic recording medium in accordance with one embodiment of the present invention.

The first and second grinders may include a pair of tables, namely, upper and lower tables 11 and 12, as illustrated in FIG. 1. The upper and lower tables 11 and 12 of a grinder 10 rotate in mutually opposite directions as indicated by arrows in FIG. 1, while sandwiching a plurality of bases (that is, the plated Al alloy substrates) W between the upper and lower tables 11 and 12. Both surfaces of each of the bases W are polished by polishing pads 13 provided on the upper and lower tables 11 and 12, respectively.

Figure 2:
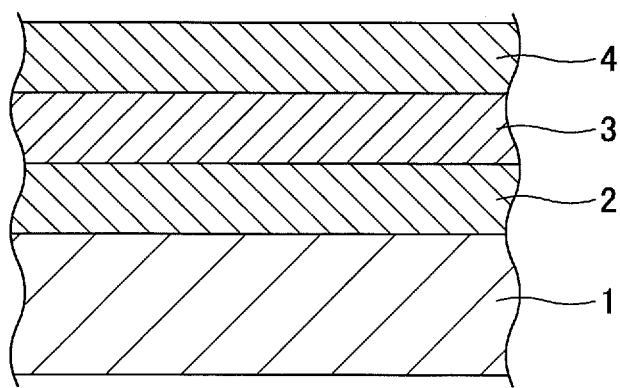
FIG. 2 is a cross sectional view schematically illustrating an example of the magnetic recording medium in one embodiment of the present invention.

FIG. 2 is a cross sectional view schematically illustrating an example of the magnetic recording medium in one embodiment of the present invention.

A magnetic recording medium 111 illustrated in FIG. 2 includes a substrate 1 for the magnetic recording medium 111, a magnetic layer 2, a protection layer 3, and a lubricant layer 4. The magnetic layer 2, the protection layer 3, and the lubricant layer 4 are successively stacked on the substrate 1 in this order.

The magnetic recording medium in one embodiment is not limited to the stacked structure illustrated in FIG. 2, and may have any of the various known stacked structures.

Figure 3:
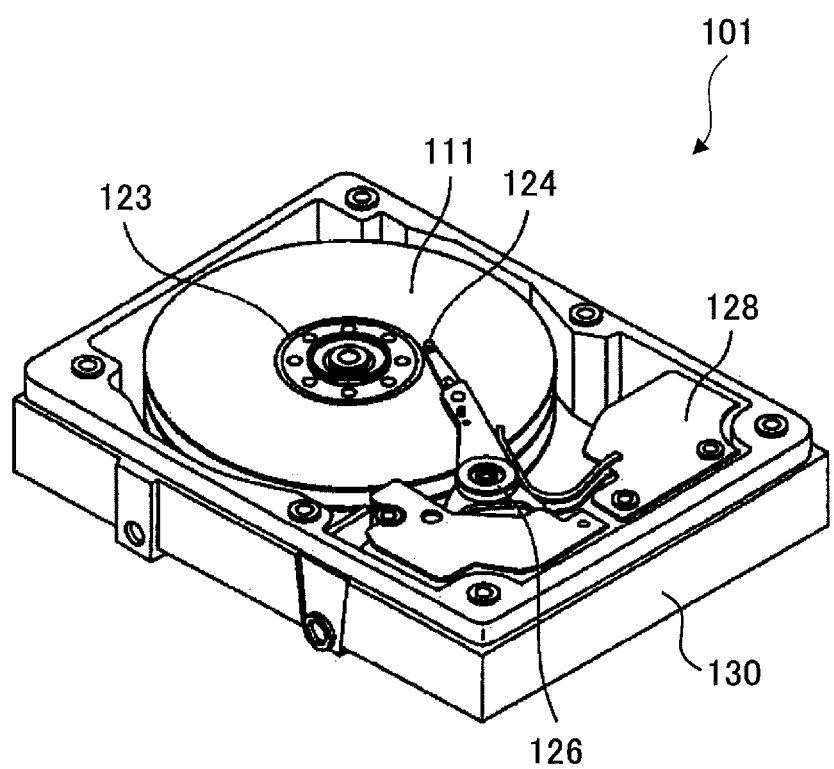
FIG. 3 is a perspective view illustrating an example of a HDD in one embodiment of the present invention.

FIG. 3 is a perspective view illustrating an example of a HDD in one embodiment of the present invention.

A HDD 101 illustrated in FIG. 3 includes a plurality of magnetic recording media 111, a driving mechanism 123 that drives and rotates the magnetic recording media 111 in a recording direction, a plurality of magnetic heads 124, a head moving mechanism 126 that moves the magnetic heads 124 relative to the magnetic recording media 111, and a signal processor 128 that are accommodated within a HDD casing 130. Each magnetic head 124 may include a write part that writes information to a corresponding one of the magnetic recording media 111, and a read part that reads information from the corresponding one of the magnetic recording media 111. The signal processor 128 processes signals that are written to the magnetic recording media 111 by the magnetic heads 124, and signals that are read from the magnetic recording media 111 by the magnetic heads 124.

The base for the magnetic recording medium of one embodiment, used in each magnetic recording medium 111, can reduce the fluttering. Hence, the base for the magnetic recording medium can be made thin, and it is possible to increase the number of magnetic recording media 111 accommodatable within the standardized HDD casing 130. Accordingly, the HDD 101 that is provided can have a high recording capacity.

The machinability of the substrate 1 for the magnetic recording medium 111 can be improved when manufacturing the magnetic recording medium 111, and the magnetic recording medium 111 can be manufactured at a low cost. Consequently, it is possible to reduce the cost per bit of the HDD having the high recording capacity.

In addition, the base for the magnetic recording medium in one embodiment can reduce the fluttering in air, thereby making it unnecessary to encapsulate a low-molecular gas, such as helium gas or the like, inside HDD casing 130. As a result, the manufacturing cost of the HDD 101 having the high recording capacity can be reduced.

The HDD 101 is preferably applied to the 3.5-inch standardized HDD having the high recording capacity.

[Exemplary Implementations & Comparison Examples]

Next, a description will be given of exemplary implementations according to the present invention, together with comparison examples.

[Manufacturing Al Alloy Substrate]

FIG. 4 is a diagram illustrating compositions of composition-adjusted Al alloy materials forming the Al alloy substrates of exemplary implementations EI1 through EI19 and comparison examples CE1 through CE14. Composition-adjusted Al alloy materials having the compositions illustrated in FIG. 4, used for the Al alloy substrate, are manufactured by direct-chill casting at a casting rate of 80 mm/minute. Cast ingots that are manufactured from the composition-adjusted Al alloys are held at 460° C. for 2 hours for homogenizing, and is thereafter subjected to rolling to form plate members having a thickness of 1.2 mm. Thereafter, the plate members are punched into disk-shaped plates (or substrates) having an outer diameter of 97 mm and a center opening at a center thereof. After sintering the disk-shaped plates at 380° C. for 1 hour, top, bottom, and end surfaces of the disk-shaped plates are subjected to machining by rotation using a diamond bit, to foist the Al alloy substrates.

As an example, the Al alloy forming the Al alloy substrate of the exemplary implementation EI1 illustrated in FIG. 4 has the composition including 11.00 mass % Si, 0.10 mass % Mn, 0.35 mass % Zn, 0.015 mass % Sr, 0.20 mass % Cu, 0.05 mass % Mg, 0.03 mass % Zr, and Al amounting to a remainder of the Al alloy. The compositions of the Al alloys for the remaining exemplary implementations EI2 through EI19 are as illustrated in FIG. 4. On the other hand, as an example, the Al alloy forming the Al alloy substrate of the comparison example CE1 illustrated in FIG. 4 has the composition including 9.40 mass % Si, 0.20 mass % Mn, 0.33 mass % Zn, 0.01 mass % Sr, 0.20 mass % Cu, 0.20 mass % Mg, 0.15 mass % Zr, and Al amounting to a remainder of the Al alloy. The compositions of the Al alloys for the remaining comparison examples CE2 through CE14 are as illustrated in FIG. 4.

FIG. 5 is a diagram illustrating performances of the Al alloy substrates of the exemplary implementations EI1 through EI19 and the comparison examples CE1 through CE14. As an example, the Al alloy substrate of the exemplary implementation EI1 has an outer diameter of 96 mm, a thickness of 0.800 mm, Si grains or Al—Si compound grains having a maximum grain diameter of 6.7 μm and a distribution density that is 0 grains/mm$^2$ for the grains having the maximum grain diameter of 8 μm or greater, and a hardness value of Vickers, Hv, of 67.7. The performances of the Al alloys for the remaining exemplary implementations EI2 through EI19 are as illustrated in FIG. 5. On the other hand, as an example, the Al alloy substrate of the comparison example CE1 has an outer diameter of 96 mm, a thickness of 0.800 mm, Si grains or Al—Si compound grains having a maximum grain diameter of 4.0 μm and a distribution density that is 0 grains/mm$^2$ for the grains having the maximum grain diameter of 8 μm or greater, and a hardness value of Vickers, Hv, of 63.6. The performances of the Al alloys for the remaining comparison examples CE2 through CE14 are as illustrated in FIG. 5.

[Si Grains or Al—Si Compound Grains]

A cross-section observation is made on the alloy structure of the Al alloy substrate, to measure the maximum grain diameter of the Si grains or the Al—Si compound grains, and the distribution density of, the grains having the maximum grain diameter of 8 μm or greater.

More particularly, each sample is cut into a 10 mm square shape, and embedded in a resin. For example, Demotec20 manufactured by Bodson Quality Control, which is a cold setting type resin having a powder:liquid mixture, or a mass ratio 2:1, is used for the resin. Next, the sample is subjected to wet or chemical polishing, to set a cross section in a horizontal direction with respect to the direction of rolling, and thereafter etched. The sample in this state is dipped in a 2.3 mass % hydrofluoric acid solution at room temperature for 30 seconds, and thereafter extracted from the 2.3 mass % hydrofluoric acid solution. The extracted sample is cleaned in running water for 1 minute, and to obtain the etched sample.

A backscattered electron image of the alloy structure forming the etched sample of the Al alloy substrate is captured using a FE-SEM (Field Emission-Scanning Electron Microscope) JSM-7000F manufactured by JEOL Ltd. Prior to capturing the backscattered electron image, the etched sample is subjected to a conductive treatment by carbon deposition, and the backscattered electron image is captured by setting a magnification to 2000 times. The backscattered electron image having a field area of 2774 μm$^2$ is subjected to a binarization process using WinROOF (Ver 6.5) manufactured by Mitani Corporation, to measure the Si grains or the Al—Si compound grains having the maximum grain diameter, and the distribution density for the grains having the maximum grain diameter of 8 μm or greater. More particularly, the binarization process is performed by setting a threshold value in a range of 200 to 255 (or in a range of 135 to 255 if the binarization process is unsuccessful) by discriminant analysis. The image obtained by the binarization process is subjected to a plugging process to fill dents, pits, or the like, and an elimination process to eliminate the grains having the grain diameter of 0.3 μm or less, in order to measure the Si grains or the Al—Si compound grains having the maximum grain diameter, and the distribution density for the grains having the maximum grain diameter of 8 μm or greater.

Figure 6:
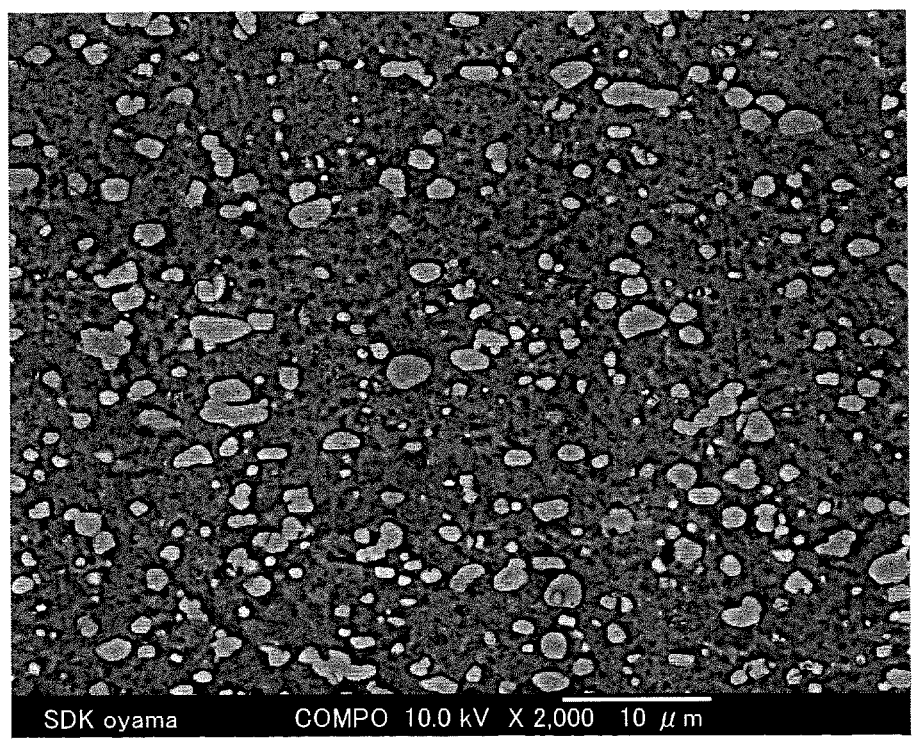
FIG. 6 is a backscattered electron image of an alloy structure forming an Al alloy substrate in an exemplary implementation.

FIG. 6 is a backscattered electron image of the alloy structure forming the Al alloy substrate in the exemplary implementation EI1.

Figure 7:
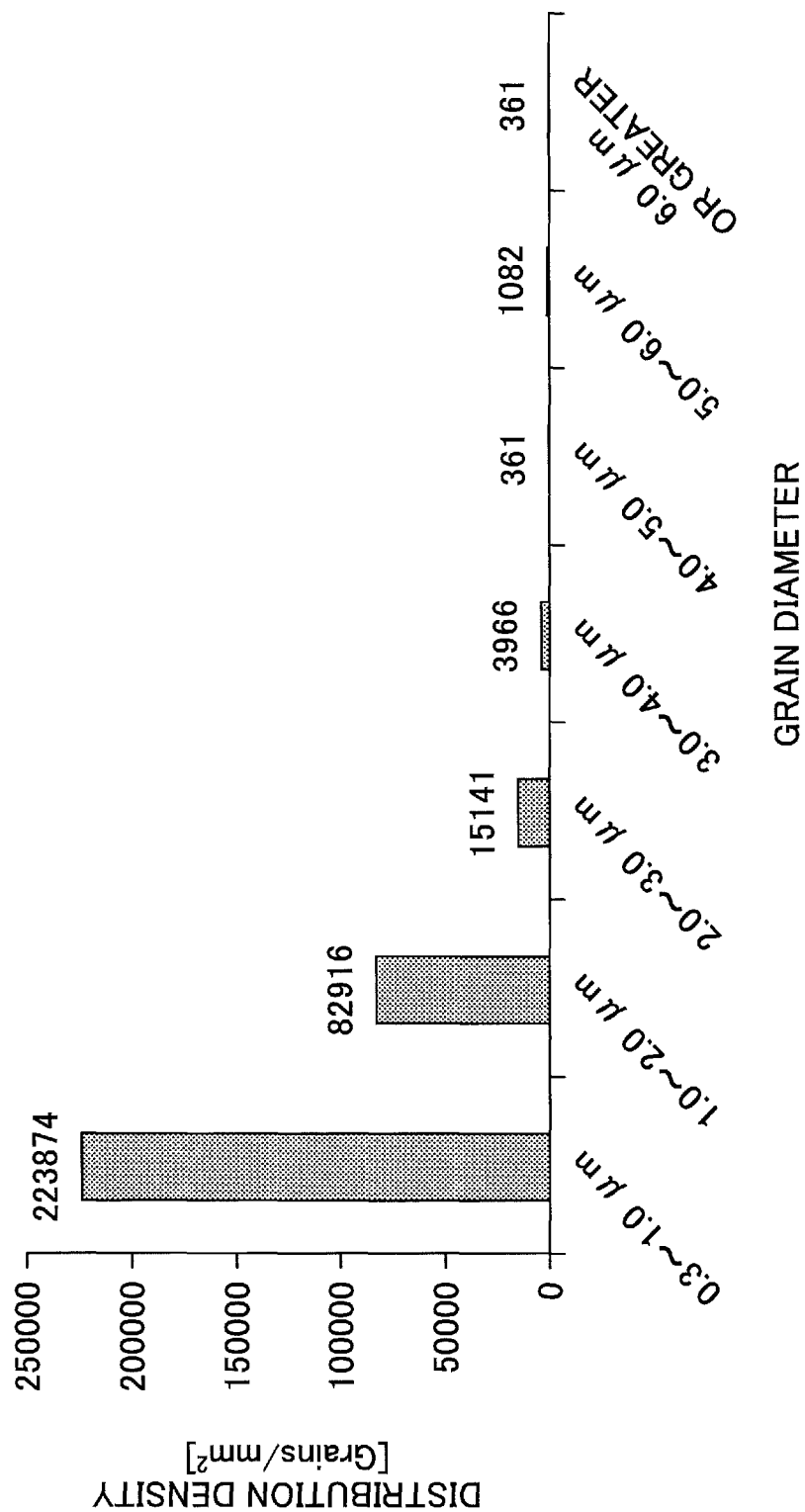
FIG. 7 is a histogram of grain diameter distribution of Si grains or Al—Si compound grains of the alloy structure forming the Al alloy substrate in the exemplary implementation.

FIG. 7 is a histogram of grain diameter distribution of the Si grains or the Al—Si compound grains of the alloy structure forming the Al alloy substrate in the exemplary implementation EI1.

In the case of the exemplary implementation EI1, the alloy structure of the Al alloy substrate is such that the maximum grain diameter of the Si grains or the Al—Si compound grains is 6.7 μm.

[Hardness Value of Vickers, Hv]

The hardness value of Vickers, Hv, of the Al alloy substrate is measured in conformance with JIS (Japanese Industrial Standards) Z 2244.

FIG. 8 is a diagram illustrating properties and evaluation results of the bases for the magnetic recording media of the exemplary implementations EI1 through EI19 and the comparison examples CE1 through CE14. In FIG. 8, a double circle mark indicates a superior state particularly suited for use, a single circle mark "o" indicates a satisfactory state suited for use, and a cross mark "x" indicates an unsatisfactory state unsuited for use, for each of the machinability and the plating property.

As an example, the base for the magnetic recording medium of the exemplary implementation EI1 has an NiP-based alloy film having a thickness of 10 μm, a Young's modulus E of 82.2 GPa, a density ρ of 2.71 g/cm$^3$, a ratio E/ρ of 30.33, a fluttering displacement of 3.2 μm, a machinability that is superior, and a plating property that is superior. The properties and the evaluation results of the bases for the magnetic recording media for the remaining exemplary implementations EI2 through EI19 are as illustrated in FIG. 8. On the other hand, as an example, the base for the magnetic recording medium of the comparison example CE1 has an NiP-based alloy film having a thickness of 10 μm, a Young's modulus of 77.9 GPa, a density ρ of 2.72 g/cm$^3$, a ratio E/ρ of 28.64, a fluttering displacement of 3.5 μm, a machinability that is superior, and a plating property that is superior. The properties and the evaluation results of the bases for the magnetic recording media for the remaining comparison examples CE2 through CE14 are as illustrated in FIG. 8.

[Electroless Plating of NiP-Based Alloy Film]

A film made of $Ni_{88}P_{12}$ (P-content of 12 mass %, the remainder being Ni) is plated on the surface of the Al alloy substrate by electroless plating, as an example of the NiP-based alloy film.

Nickel sulfate, sodium hypophoshite, and lead acetate may be used for the plating solution, and sodium citrate and sodium borate are appropriately added thereto, with the amounts of each of the components adjusted so that the NiP-based alloy film having the above described composition can be plated. For example, the plating solution has a pH of 6, and a temperature of 90° C. In addition, an immersion time in the plating solution is 2 hours. Further, the Al alloy substrate after being subjected to plating of the NiP-based alloy film is heated at 300° C. for 3 minutes.

[Plating Property]

The surface of the Al alloy substrate after being subjected to plating of the NiP-based alloy film is observed by a differential interference optical microscope with a magnification of 1000 times, to evaluate the plating property from a surface smoothness and existence of dents, pits, or the like at the surface.

[Polishing]

A 3-stage lapping machine having a grinder with a pair of upper and lower tables is used to polish the surface of the NiP-based alloy film plated on the Al alloy substrate, to make the base for the magnetic recording medium. A suede type polishing pad manufactured by Filwel Co., Ltd. is used. A first polishing stage uses alumina abrasive grains having an average grain size $D_{50}$ of 0.5 μm, a second polishing stage uses colloidal silica abrasive grains having an average grain size $D_{50}$ of 30 nm, and a third polishing stage uses colloidal silica abrasive grains having an average grain size $D_{50}$ of 10 nm. A polishing time of each polishing stage is 5 minutes.

[Young's Modulus]

Next, the Young's modulus of each base for the magnetic recording medium is measured.

The Young's modulus of each base for the magnetic recording medium, manufactured as described above, is measured at room temperature, based on JIS 2280-1993. Measured samples have a cube shape with a length of 50 mm, a width of 10 mm, and a thickness of 1.0 mm.

[Density]

Next, the density ρ of each base for the magnetic recording medium is computed.

The density ρ of each base for the magnetic recording medium is computed using known literature values for the densities of constituent elements.

[Fluttering Displacement]

Each base for the magnetic recording medium, manufactured as described above, is rotated at 10000 rpm, and the fluttering displacement occurring at an outermost peripheral surface of each base for the magnetic recording medium is measured using a He—Ne laser displacement gauge.

[Machinability]

The surface of the Al alloy substrate is observed by a differential interference optical microscope with a magnification of 1000 times, to evaluate the machinability from a surface smoothness of the Al alloy substrate.

[Evaluation]

It is confirmed from the properties and the evaluation results of the bases for the magnetic recording media illustrated in FIG. 8 that the bases for the magnetic recording medium according to the exemplary implementations EI1 through EI19 have small fluttering, even though these bases are thin. It is also confirmed from FIG. 8 that the bases for the magnetic recording medium according to the exemplary implementations EI1 through EI19 have superior or satisfactory machinability (or surface smoothness), even though these bases are thin. In other words, the properties and the evaluation results of the bases for the magnetic recording media according to the exemplary implementations EI1 through EI19 are more satisfactory compared to those of the comparison examples CE1 through CE14.

According to the embodiments and exemplary implementations described above, it is possible to provide a base for a magnetic recording medium, capable of reducing fluttering even when a thickness of the magnetic recording medium is reduced. For this reason, it is possible to increase a number of magnetic recording media that can be accommodated within a casing of a standardized HDD, and provide a high recording capacity (or high storage capacity). In addition, the machinability of the base can be improved when manufacturing the magnetic recording medium.

Although the exemplary implementations are numbered with, for example, "first," "second," "third," etc., the ordinal numbers do not imply priorities of the exemplary implementations.

Further, the present invention is not limited to these embodiments and exemplary implementations, but various variations and modifications may be made without departing from the scope of the present invention.

What is claimed is:

1. A base for a magnetic recording medium, comprising:
a substrate made of an Al alloy and having a surface; and
a film made of a NiP-based alloy and plated on the surface of the substrate,
wherein the Al alloy includes Si in a range of 9.5 mass % to 13.0 mass %, Mn in a range of 0.05 mass % to 0.40 mass %, Zn in a range of 0.30 mass % to 0.40 mass %, Sr in a range of 0.005 mass % to 0.03 mass %, Cu in a range of 0.05 mass % to 0.50 mass %, Mg in a range of 0.05 mass % to 0.50 mass %, and Zr in a range of 0.03 mass % to 0.30 mass %,
wherein the substrate has a distribution density of 300 grains/mm$^2$ or lower for grains having a maximum diameter of 8 μm or greater, between Si grains and Al—Si compound grains, and a Young's modulus of 79 GPa or higher,
wherein the film has a thickness of 7 μm or greater, and
wherein the base has an outer diameter of 53 mm, and a thickness of 0.9 mm or less.

2. The base for the magnetic recording medium as claimed in claim 1, wherein a ratio E/ρ is 29 GPa·cm$^3$/g or greater, where E GPa denotes the Young's modulus of the substrate, and ρ g/cm$^3$ denotes a density of the substrate.

3. A hard disk drive comprising:
a plurality of magnetic disks;
a plurality of heads configured to write information to and read information from the plurality of magnetic disks; and
a casing configured to accommodate the plurality of magnetic disks and the plurality of heads,
wherein each of the plurality of magnetic disks includes:
a substrate made of an Al alloy and having a surface; and
a film made of a NiP-based alloy and plated on the surface of the substrate,
wherein the Al alloy includes Si in a range of 9.5 mass % to 13.0 mass %, Mn in a range of 0.05 mass % to 0.40 mass %, Zn in a range of 0.30 mass % to 0.40 mass %, Sr in a range of 0.005 mass % to 0.03 mass %, Cu in a range of 0.05 mass % to 0.50 mass %, Mg in a range of 0.05 mass % to 0.50 mass %, and Zr in a range of 0.03 mass % to 0.30 mass %,
wherein the substrate has a distribution density of 300 grains/mm$^2$ or lower for grains having a maximum diameter of 8 μm or greater, between Si grains and Al—Si compound grains, and a Young's modulus of 79 GPa or higher,
wherein the film has a thickness of 7 μm or greater, and
wherein the base has an outer diameter of 53 mm, and a thickness of 0.9 mm or less.

4. The hard disk drive as claimed in claim 3, wherein a ratio E/ρ is 29 GPa·cm$^3$/g or greater, where E GPa denotes the Young's modulus of the substrate of each of the plurality of magnetic disks, and ρ g/cm$^3$ denotes a density of the substrate of each of the plurality of magnetic disks.

5. The hard disk drive as claimed in claim 3, wherein the casing accommodates the plurality of magnetic disks and the plurality of heads in air.

6. The hard disk drive as claimed in claim 3, wherein each of the plurality of magnetic disks are 3.5-inch standardized magnetic disks.

* * * * *